(12) United States Patent
Chen et al.

(10) Patent No.: US 9,518,235 B2
(45) Date of Patent: Dec. 13, 2016

(54) ENTRAINED-FLOW GASIFIER AND GASIFICATION METHOD USING THE SAME FOR SYNTHESIZING SYNGAS FROM BIOMASS FUEL

(71) Applicant: WUHAN KAIDI GENERAL RESEARCH INSTITUTE OF ENGINEERING & TECHNOLOGY CO., LTD., Wuhan (CN)

(72) Inventors: Yilong Chen, Wuhan (CN); Yanfeng Zhang, Wuhan (CN); Minggui Xia, Wuhan (CN); Liang Zhang, Wuhan (CN)

(73) Assignee: WUHAN KAIDI ENGINEERING TECHNOLOGY RESEARCH INSTITUTE CO., LTD., Wuhan (CN)

( * ) Notice: Subject to any disclaimer, the term of this patent is extended or adjusted under 35 U.S.C. 154(b) by 187 days.

(21) Appl. No.: 14/314,023

(22) Filed: Jun. 24, 2014

(65) Prior Publication Data
US 2014/0306160 A1 Oct. 16, 2014

Related U.S. Application Data

(63) Continuation-in-part of application No. PCT/CN2012/083562, filed on Oct. 26, 2012.

(30) Foreign Application Priority Data

Dec. 29, 2011 (CN) .......................... 2011 1 0449413

(51) Int. Cl.
*C10J 3/72* (2006.01)
*C10J 3/18* (2006.01)
(Continued)

(52) U.S. Cl.
CPC .. *C10J 3/72* (2013.01); *C10J 3/18* (2013.01); *C10J 3/485* (2013.01); *C10J 3/506* (2013.01);
(Continued)

(58) Field of Classification Search
CPC ................... C10J 2300/123; C10J 2300/1238; C10J 2300/0906; C10J 2300/463
See application file for complete search history.

(56) References Cited

U.S. PATENT DOCUMENTS 3,948,640 A * 4/1976 Elvander ................ B01J 8/1836
201/19
2004/0251241 A1* 12/2004 Blutke .................... C01B 3/342
219/121.59
(Continued)

*Primary Examiner* — Matthew Merkling
(74) *Attorney, Agent, or Firm* — Matthias Scholl P.C.; Matthias Scholl

(57) ABSTRACT

A microwave plasma based entrained flow gasifier of biomass, including a furnace body and a fuel pretreatment system. The furnace body includes a fuel inlet disposed at the lower part of the furnace body, a syngas outlet disposed at the top of the furnace body, and a slag outlet disposed at the bottom of the furnace body. The fuel inlet presents in the form of nozzles. The fuel pretreatment system is disposed outside of the furnace body, and includes a fuel crushing apparatus, a sieving apparatus disposed downstream to the fuel crushing apparatus, a first fuel container for receiving particle size-qualified fuel, a second fuel container for receiving particle size-unqualified fuel, and a feeding hopper disposed downstream to the first fuel container. The first fuel container and the second fuel container are disposed side-by-side downstream to the sieving apparatus.

6 Claims, 2 Drawing Sheets

(51) Int. Cl.
*C10J 3/48* (2006.01)
*C10J 3/50* (2006.01)

(52) U.S. Cl.
CPC ......... *C10J 3/723* (2013.01); *C10J 2200/152* (2013.01); *C10J 2300/0906* (2013.01); *C10J 2300/0916* (2013.01); *C10J 2300/0959* (2013.01); *C10J 2300/0976* (2013.01); *C10J 2300/1238* (2013.01); *Y02P 20/145* (2015.11)

(56) References Cited

U.S. PATENT DOCUMENTS

| | | | | |
|---|---|---|---|---|
| 2007/0253874 A1* | 11/2007 | Foret | ...................... | C02F 1/006 |
| | | | | 422/186.07 |
| 2007/0266633 A1* | 11/2007 | Tsangaris | ................ | C01B 3/342 |
| | | | | 48/197 R |
| 2008/0277265 A1* | 11/2008 | Tsangaris | ................... | C10J 3/24 |
| | | | | 204/157.15 |

* cited by examiner

ENTRAINED-FLOW GASIFIER AND GASIFICATION METHOD USING THE SAME FOR SYNTHESIZING SYNGAS FROM BIOMASS FUEL

CROSS-REFERENCE TO RELATED APPLICATIONS

This application is a continuation-in-part of International Patent Application No. PCT/CN2012/083562 with an international filing date of Oct. 26, 2012, designating the United States, now pending, and further claims priority benefits to Chinese Patent Application No. 201110449413.4 filed Dec. 29, 2011. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18$^{th}$ Floor, Cambridge, Mass. 02142.

BACKGROUND OF THE INVENTION

Field of the Invention

The invention relates to the gasification of biomass, and more particularly to an entrained-flow gasifier and a gasification method using the same for synthesizing syngas from biomass fuel in the presence of microwave-excited plasma.

Description of the Related Art

Biomass gasification process generally includes fixed bed gasification, fluidized bed gasification, entrained flow gasification. The fixed bed gasification has defects such as low gasification temperature, high tar content, and low-quality syngas. The fluidized bed gasification has a moderate gasification temperature and convenient feeding and discharging, to ensure the stable fluidization, the furnace temperature must be controlled to be moderate. Low gasification temperature results in high content of tar in the syngas. The tar is difficult to remove and easily blocks and corrodes the valves, pipes, and auxiliary equipment. The removal of the tar costs much. The entrained flow gasification has a high and uniform reaction temperature, high gasification efficiency, and the tar is completely cracked. However, the entrained flow gasification has a high requirement on the particle size of the raw materials. In general, the particle size should be less than 0.1 mm. Biomass contains much cellulose, which is very difficult to be crushed to have a small particle size to meet the requirement of the entrained flow bed. The smaller the required particle size is, the larger the abrasion of the crusher is, and the higher the energy consumption is. Large particle size causes the low carbon conversion rate and low cold gas efficiency, which greatly limits the application of conventional entrained flow beds in the synthesis of syngas.

SUMMARY OF THE INVENTION

In view of the above-described problems, it is one objective of the invention to provide an entrained-flow gasifier and a gasification method using the same for synthesizing syngas of carbon monoxide and hydrogen from biomass fuel in the presence of microwave-excited plasma with characteristics of economy, high efficiency, and feasibility.

To achieve the above objective, in accordance with one embodiment of the invention, there is provided a microwave plasma based entrained flow gasifier of biomass, comprises a furnace body and a fuel pretreatment system. The furnace body is vertically disposed and comprises a fuel inlet disposed at a lower part of the furnace body, a syngas outlet disposed at a top of the furnace body, and a slag outlet disposed at a bottom of the furnace body. The fuel inlet presents in the form of nozzles. The fuel pretreatment system is disposed outside of the furnace body, and comprises a fuel crushing apparatus, a sieving apparatus disposed downstream to the fuel crushing apparatus, a first fuel container for receiving particle size-qualified fuel, a second fuel container for receiving particle size-unqualified fuel, and a feeding hopper disposed downstream to the first fuel container. The first fuel container and the second fuel container are disposed side-by-side downstream to the sieving apparatus; a bottom of the feeding hopper is connected to the furnace body via the nozzles. A monitoring unit is disposed close to the syngas outlet at the top of the furnace body. The nozzles are disposed radially along the furnace body and are between 2 and 4 in number. One or two layers of microwave plasma generators are in parallel disposed at a gasification zone of the furnace body, and each layer of the microwave plasma generator comprises between 2 and 4 working gas inlets.

In a class of this embodiment, the microwave plasma generators are disposed horizontally/tangentially on the furnace body so as to prolong the retention time of the melting particles of the biomass in the plasma atmosphere.

In a class of this embodiment, the microwave plasma generators have large electrode gap, strong plasma activity, and wide volume range.

In a class of this embodiment, a microwave power source of the microwave plasma generators has a basic frequency of 2.45 GHz, and a power of a single microwave plasma generator is within 200 kW.

A method for gasifying biomass using the entrained flow gasifier comprises:

1) crushing and sieving a biomass fuel using the fuel pretreatment system to yield particle size-qualified fuel particles, and transporting the particle size-qualified fuel particles to the feeding hopper for use;
2) introducing working gas from the working gas inlets into the microwave plasma generator, exciting the working gas to yield high temperature, high degree of ionization, and high activity of plasma, and spraying the plasma to into the gasifier;
3) spraying the particle size-qualified fuel particles into the gasifier via the nozzles, synchronously spraying an oxidizer via an oxygen/vapor inlet into the gasifier, so that a high temperature and rapid thermal chemical reaction between the fuel particles and the oxidizer in the presence of high activity of plasma proceeds to yield syngas comprising carbon monoxide and hydrogen; and
4) monitoring the temperature and components of the syngas, regulating oxygen flow rate, vapor flow rate, and microwave power to maintain the process parameters within a preset range, collecting the syngas having a temperature of between 900 and 1200° C. from the syngas outlet at the top of the furnace body, and discharging liquid slags from the slag outlet.

In a class of this embodiment, in step 1), the particle size-qualified fuel particles are received by the first fuel container, the particle size-unqualified fuel particles are first received by the second fuel container and then returned to the fuel pretreatment system for crushing again until meeting the particle size requirement; the particle size-qualified fuel particles are transported from the first container to the feeding hopper; and the particle size of the fuel particles is between 0 and 5 mm.

In a class of this embodiment, in step 2), the start-up of the microwave plasma generators is between 2 and 3 seconds earlier than the start-up of the nozzles of the gasifier; the working gas comprises an auxiliary oxidizer, and is introduced into the microwave plasma generators via the working gas inlets to be excited to yield high temperature, high degree of ionization, and high activity of plasma.

In a class of this embodiment, in step 3), the particle size-qualified fuel particles are carried by carrier gas and sprayed into the gasifier via the nozzles; the oxidizers are synchronously sprayed into the gasifier via the oxygen/vapor inlet, so that a partial oxidation-reduction reaction and high temperature gasification reaction between the fuel particles and the oxidizer proceed to yield syngas comprising a large amount of carbon monoxide and hydrogen and a small amount of $CO_2$, $CH_4$, $H_2S$, and COS.

The syngas flows upward to the gasification zone of the microwave plasma generators, and mixes with the horizontally/tangentially sprayed plasma gas for high-temperature thermo-chemical gasification reaction at between 1200 and 1800° C., a central zone temperature is between 1800 and 2000° C., a retention time of the syngas in the gasification zone is between 1 and 10 seconds, and the power of the microwave plasma generators is controlled to drive the reaction to proceed completely.

In step 4), the volume content of CO and $H_2$ in the syngas exceeds 85%, the syngas contains no tar and no phenolic compounds, the liquid slag discharged from the slag outlet is chilled to be pollution-free, which can be used as a thermal insulation material.

In a class of this embodiment, in steps 2) and 3), the working gas and the carrier gas are air and/or oxygen and/or vapor; and the vapor is originated from the recycling of sensible heat of high temperature syngas.

In this disclosure, the microwave plasma generator is disposed in the gasification zone of the gasifier. The working gas in the microwave plasma generator is excited by microwave to produce plasma. The microwave-excited plasma is rich in oxidizers and has characteristics of high temperature, high degree of ionization, high dispersity, and high activity. When the working gas is sprayed into the redox zone of the entrained flow bed, in the presence of the high temperature and high activity of plasma, on one hand, the reaction temperature is enhanced, which accelerates the chemical reaction, on the other hand, the high temperature and high activity of plasma can greatly improve the chemical reaction between syngas and solid-phase/liquid-phase biomass particles, thereby improving the heat and mass transfer rate, and shortening the chemical reaction time of the biomass fuel. The fuel conversion is significantly improved within the same retention time. Compared to coal, the biomass fuel has large void space, high activity and low melting point. Thus, in the presence of the high temperature and high activity of plasma, the particle size of the applied biomass fuel can be significantly higher than that required by conventional entrained flow bed, and the conversion effect is ideal.

Additionally, the microwave plasma generator supplies an auxiliary oxidizer for the gasification reaction, which ensures the balance and uniformity of the supply of the reactants, and inputs a certain thermal power, which provides some external thermal source. The introduction of the auxiliary oxidizer is a good means to regulate the operation of the gasifier.

Advantages according to embodiments of the invention are summarized as follows.

1. The biomass fuel has high activity, in the presence of high temperature microwave-excited plasma, the carbon conversion rate reaches about 99%, the cold gas efficiency exceeds 85%, and the active components of CO and $H_2$ have high content.

2. The resulting syngas from the entrained flow gasifier contains no tar and no phenolic compounds, and the subsequent collection of the syngas is convenient.

3. In this disclosure, the biomass fuels do not need to be crushed to have an extremely small particle sizes, that is to say, the application range of the particle sizes of the biomass fuel is wide, and thus the gasifier has good economic efficiency.

4. The material feeding and the slag discharging are easy, and the gasification intensity is high, which facilitates the popularization.

BRIEF DESCRIPTION OF THE DRAWINGS

The invention is described hereinbelow with reference to accompanying drawings, in which.

Figure 1:
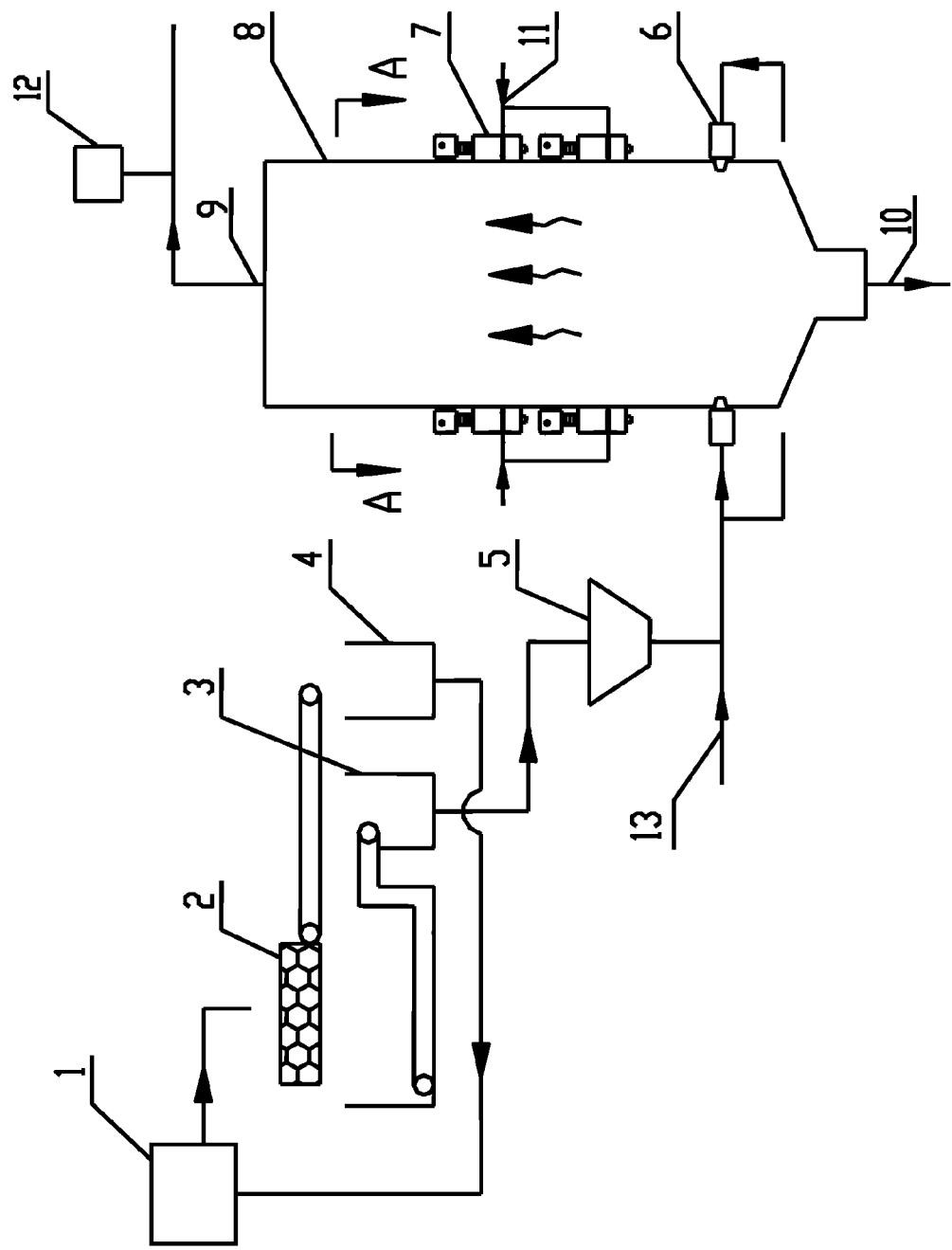
FIG. 1 shows a schematic diagram of a microwave plasma based entrained flow gasifier of biomass and a flow chart of a gasification method using the same according to one embodiment of the invention.

In the drawings, the following reference numbers are used: 1. Fuel crushing apparatus; 2. Sieving apparatus; 3. First fuel container for receiving particle size-qualified fuel; 4. Second fuel container for particle size-unqualified fuel; 5. Feeding hopper; 6. Nozzle; 7. Microwave plasma generator; 8. Gasifier; 9. Syngas outlet; 10. Slag outlet; 11. Working gas inlet; 12. Monitoring unit; 13. Oxygen/vapor inlet.

DETAILED DESCRIPTION OF THE EMBODIMENTS

For further illustrating the invention, experiments detailing an entrained-flow gasifier and a gasification method using the same for synthesizing syngas from biomass fuel are described below. It should be noted that the following examples are intended to describe and not to limit the invention.

Figure 2:
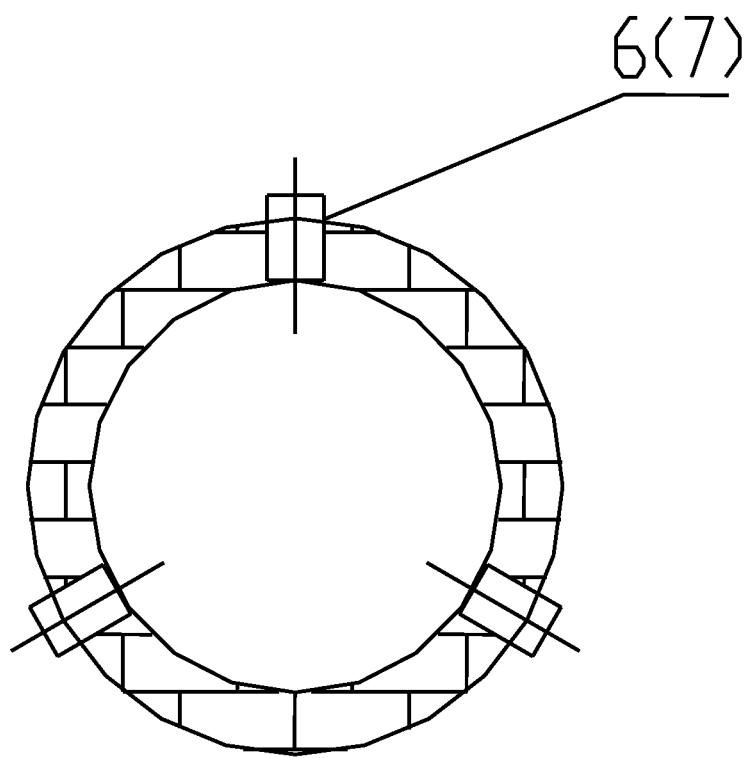
FIG. 2 is a sectional view taken from Line A-A of FIG. 1.

As shown in FIGS. 1 and 2, a microwave plasma based entrained flow gasifier 8 of biomass, comprises a cylindrical furnace body and a fuel pretreatment system. The furnace body is vertically disposed, and comprises a fuel inlet disposed at a lower part of the furnace body, a syngas outlet 9 disposed at a top of the furnace body, and a slag outlet 10 disposed at a bottom of the furnace body. The fuel inlet presents in the form of nozzles 6. The fuel pretreatment system is disposed outside of the furnace body, and comprises a fuel crushing apparatus 1, a sieving apparatus 2 disposed downstream to the fuel crushing apparatus 1, a first fuel container 3 for receiving particle size-qualified fuel, a second fuel container 4 for receiving particle size-unqualified fuel, and a feeding hopper 5 disposed downstream to the first fuel container. The first fuel container and the second fuel container are disposed side-by-side downstream to the sieving apparatus. A bottom of the feeding hopper 5 is connected to the furnace body via the nozzles 6. One or two layers of microwave plasma generators 7 are in parallel disposed at a gasification zone of the furnace body for expanding the plasma reaction zone, and each layer of the microwave plasma generator comprises between 2 and 4 working gas inlets 11 (it is three in FIG. 2). The furnace body of the gasifier is cylindrical, or a combination of cone and cylinder.

The positioning of the microwave plasma generators greatly affects the gasification of the biomass fuel. In this example, the microwave plasma generators 7 are disposed on the furnace body both horizontally and tangentially. Thus, the gas flow is fully burbled so as to prolong the retention time of the melting particles of the biomass in the plasma atmosphere.

A monitoring unit 12 is disposed close to the syngas outlet 9 at the top of the furnace body to monitor the temperature and components of the syngas, so as to regulate oxygen flow rate, vapor flow rate, and microwave power to maintain the process parameters within a preset range.

The nozzles 6 are disposed radially along the furnace body and are between 2 and 4 in number. As needed, the number of the nozzles can be increased or decreased.

The microwave plasma generators have large electrode gap, strong plasma activity, and wide volume range.

The microwave power source of the microwave plasma generators has a basic frequency of 2.45 GHz, and a power of a single microwave plasma generator is within 200 kW.

A method for gasifying biomass using the entrained flow gasifier comprises:

1) Crushing and sieving a biomass fuel using the fuel crushing apparatus 1 and the sieving apparatus 2 to yield particle size-qualified fuel particles.

Specifically, the biomass fuel is crushed by the fuel crushing apparatus of the fuel pretreatment system to have appropriate particle sizes. The particle size of the biomass fuel is one of the key factors affecting the gasification process. The smaller the required particle size is, the larger the abrasion of the crusher is, and the higher the energy consumption is. Large particle size causes the low carbon conversion rate and low cooled coal gas efficiency. The crushed biomass fuel is transported to the sieving apparatus 2. Through sieving, the particle size-qualified fuel particles are received by the first fuel container 3, and the particle size-unqualified fuel particles are first received by the second fuel container 4 and then returned to the fuel pretreatment system for crushing again until meeting the particle size requirement. Take rice hull as an example, the particle size of rice hull is between 7 and 10 mm in length, and 2 mm in width. The rice hull just needs to be roughly crushed to have the particle size of between 1 and 5 mm. Twigs and straw have a large original particle size, which can be first crushed by a disc or drum crusher to have a particle size of between 50 and 100 mm, and then be crushed by a hammer mill to have a particle size of between 1 and 5 mm.

2) Introducing working gas from the working gas inlets 11 into the microwave plasma generator 7, exciting the working gas to yield high temperature, high degree of ionization, and high activity of plasma, and spraying the plasma to into the gasifier 8.

Specifically, the start-up of the microwave plasma generators 7 is between 2 and 3 seconds earlier than the start-up of the nozzles 6 of the gasifier. The working gas comprises an auxiliary oxidizer, and is introduced into the microwave plasma generators 7 via the working gas inlets 11 to be excited to yield high temperature, high degree of ionization, and high activity of plasma, which is further sprayed into the gasifier 8.

3) Spraying the particle size-qualified fuel particles into the gasifier 8 via the nozzles 6, synchronously spraying an oxidizer via an oxygen/vapor inlet 13 into the gasifier, so that a high temperature and rapid thermal chemical reaction between the fuel particles and the oxidizer in the presence of high activity of plasma proceeds to yield syngas comprising a large amount of carbon monoxide and hydrogen and a small amount of $CO_2$, $CH_4$, $H_2S$, and COS.

Specifically, the particle size-qualified fuel particles are transported from the first container 3 to the feeding hopper 5. Thereafter, the fuel particles are transported to the nozzles 6 of the furnace body from the bottom of the feeding hopper with the help of a gasifying agent and then enter the gasifier 8 via the nozzles 6. The oxidizers are synchronously sprayed into the gasifier via the oxygen/vapor inlet, so that a partial oxidation-reduction reaction and high temperature gasification reaction between the fuel particles and the oxidizer proceed to yield syngas comprising a large amount of carbon monoxide and hydrogen and a small amount of $CO_2$, $CH_4$, $H_2S$, and COS.

The syngas flows upward to the gasification zone of the microwave plasma generators, and mixes with the horizontally/tangentially sprayed plasma gas for high-temperature thermo-chemical gasification reaction at between 1200 and 1800° C., a central zone temperature is between 1800 and 2000° C., a retention time of the syngas in the gasification zone is between 1 and 10 seconds, and the power of the microwave plasma generators is controlled to drive the reaction to proceed completely. The syngas is finally collected from the syngas outlet 9 disposed at the top of the gasifier. The volume content of CO and $H_2$ in the syngas exceeds 85%. The syngas contains no tar and no phenolic compounds. The liquid slag discharged from the slag outlet 9 is chilled to be pollution-free, which can be used as a thermal insulation material. The vapor is originated from the recycling of the high temperature syngas.

4) Monitoring the temperature and components of the syngas, regulating oxygen flow rate, vapor flow rate, and microwave power to maintain the process parameters within a preset range, collecting the syngas having a temperature of between 900 and 1200° C. from the syngas outlet 9 at the top of the furnace body, and discharging liquid slags from the slag outlet 10.

In step 1), the particle size of the fuel particles is between 0 and 5 mm, particularly about 2 mm.

In steps 2) and 3), the working gas and the carrier gas are air and/or oxygen and/or vapor; and the vapor is originated from the recycling of sensible heat of high temperature syngas.

To achieve the optimal working conditions and satisfy the overall performance requirement of the gasification, the key is to control the temperature of the entrained flow bed, and to regulate the oxygen flow rate, vapor flow rate, and microwave power. The monitoring unit disposed close to the syngas outlet can monitor the above parameters in real time, thereby controlling the gasification process by chain and by full automation and maintaining the operation stability of the gasifier.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A gasifier, comprising: a furnace body and a fuel pretreatment system, wherein the furnace body is vertically disposed and comprises a fuel inlet disposed at a lower part of the furnace body, a syngas outlet disposed at a top of the furnace body, and a slag outlet disposed at a bottom of the furnace body;

the fuel inlet comprises nozzles;

the fuel pretreatment system is disposed outside of the furnace body, and comprises a fuel crushing apparatus, a sieving apparatus disposed downstream to the fuel crushing apparatus, a first fuel container for receiving particle size-qualified fuel, a second fuel container for receiving particle size-unqualified fuel, and a feeding hopper disposed downstream to the first fuel container;

the first fuel container and the second fuel container are disposed side-by-side downstream to the sieving apparatus;

a bottom of the feeding hopper is connected to the furnace body via the nozzles;

a monitoring unit is disposed close to the syngas outlet at the top of the furnace body;

the nozzles are disposed radially along the furnace body and are between 2 and 4 in number; and one or two layers of microwave plasma generators are disposed in parallel at a gasification zone of the furnace body, and each layer of the microwave plasma generator comprises between 2 and 4 working gas inlets.

2. The gasifier of claim 1, wherein the microwave plasma generators are disposed horizontally/tangentially on the furnace body.

3. The gasifier of claim 1, wherein the microwave plasma generators have large electrode gap, strong plasma activity, and wide volume range.

4. The gasifier of claim 2, wherein the microwave plasma generators have large electrode gap, strong plasma activity, and wide volume range.

5. The gasifier of claim 3, wherein a microwave power source of the microwave plasma generators has a basic frequency of 2.45 GHz, and a power of a single microwave plasma generator is within 200 kW.

6. The gasifier of claim 4, wherein a microwave power source of the microwave plasma generators has a basic frequency of 2.45 GHz, and a power of a single microwave plasma generator is within 200 kW.

* * * * *